Oct. 12, 1943.　　　J. DUSEVOIR　　　2,331,541
ENGINE CRANKSHAFT
Filed June 11, 1942
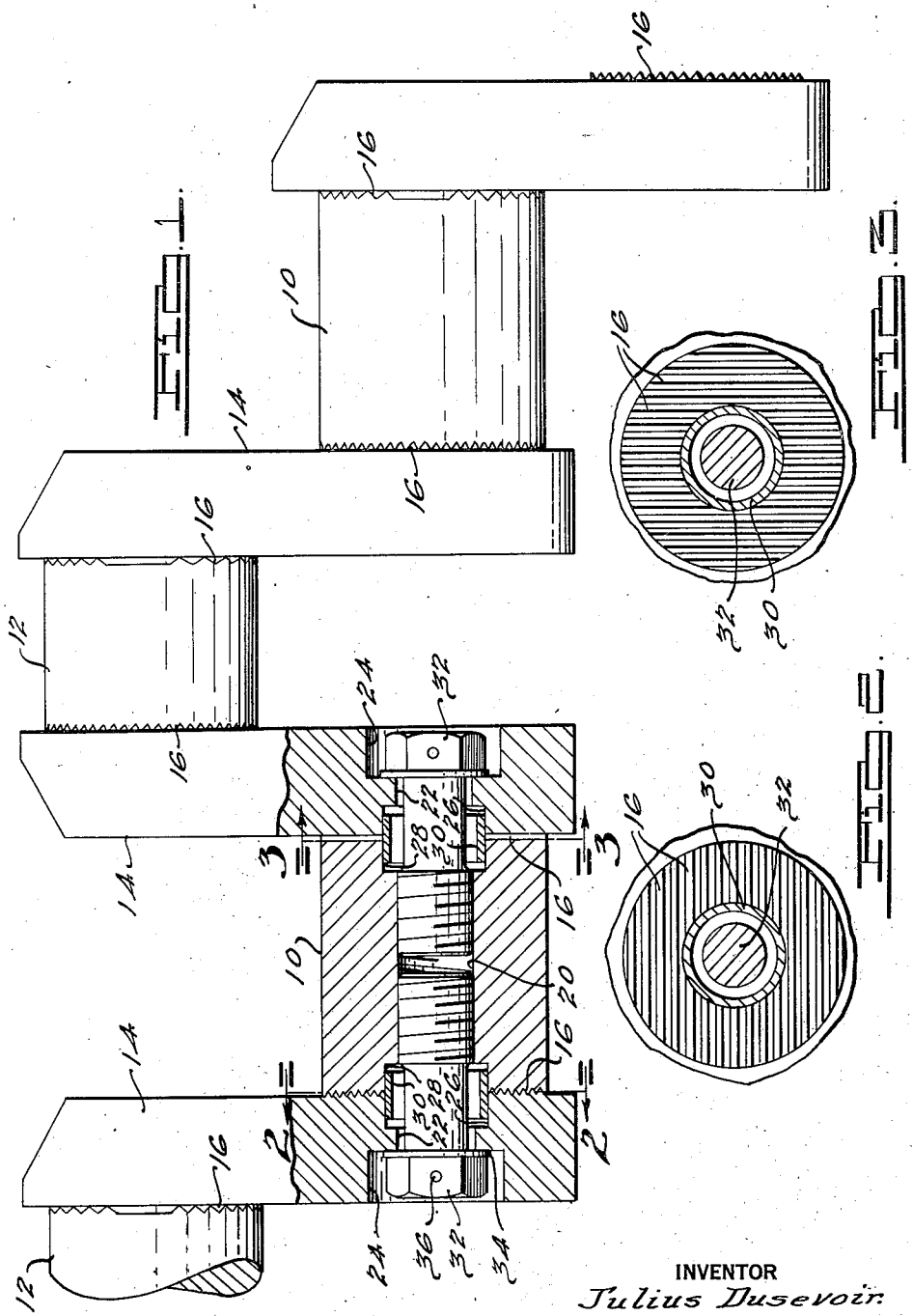
INVENTOR
*Julius Dusevoir.*
BY
*Harness, Dickey & Pierce*
ATTORNEYS.

Patented Oct. 12, 1943

2,331,541

UNITED STATES PATENT OFFICE 2,331,541

ENGINE CRANKSHAFT

Julius Dusevoir, Dearborn, Mich., assignor to Century Motors Corporation, Dearborn, Mich., a corporation of Michigan Application June 11, 1942, Serial No. 446,606

9 Claims. (Cl. 74—598)

This invention relates to engine crankshafts and particularly to crankshafts of the built-up type, the principal object being the provision of a construction for joining the various separately formed portions of the crankshaft together that is easily formed and is efficient in operation.

Objects of the invention include the provision of a connection between the various separately formed parts of an engine crankshaft including interfitting straight and parallel serrations on the abutting faces of such parts, the serrations at opposite ends of a part being so constructed and arranged that a force applied to such a part in the direction of the length of the serrations at one end thereof and therefore tending to cause the interfitting serrations at such end of a part to slip in the direction of the length of the serrations does not similarly affect the serrated connection at the opposite end of such part; the provision of a built-up engine crankshaft in which straight and parallel interfitting serrations are employed for connecting the various parts together, the serrations at one end of a part being arranged to offset forces tending to cause the opposite end of the part to slip in the direction of the length of the serrations thereof; the provision of a built-up engine crankshaft in which the various separately formed parts thereof are arranged with abutting faces in planes perpendicular to the axis of rotation of the crankshaft and such abutting faces are provided with interfitting straight and parallel serrations, the serrations at one end of a part being angularly offset from the serrations at the opposite end of the part; and the provision of a construction as above described in which the serrations at one end of a part are angularly offset from the length of the serrations at the opposite end thereof by substantially 90 degrees.

The above being among the objects of the present invention the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a fragmentary, partially broken, partially sectioned side elevational view of an engine crankshaft constructed in accordance with the present invention;

Fig. 2 is a fragmentary transverse sectional view taken on the line 2—2 of Fig. 1; and, Fig. 3 is a fragmentary transverse sectional view taken on the line 3—3 of Fig. 1.

The present invention relates to built-up crankshafts for use in internal combustion or other engines or for other purposes. By a built-up crankshaft is meant one in which various parts thereof are formed separately from each other and are then joined together to form the completed crankshaft. An illustrative example of the same is disclosed in my United States Letters Patent No. 2,013,039, issued Sept. 3, 1935, on Crankshaft. A preferable form and which the embodiment shown in the accompanying drawing follows more closely is disclosed in my application for Letters Patent of the United States for Improvements in crankshaft, filed July 31, 1941, and serially numbered 404,756.

In my previous inventions above referred to the various separately formed parts of the crankshaft are provided with mating faces lying in planes perpendicular to the axis of rotation of the crankshaft and such mating faces are provided with curved serrations which interfit one another. Means are provided for holding the separately formed parts against axial separation and against relative slippage with respect to each other in the direction of the length of the serrations. It may be noted that particularly in the last of my prior inventions above identified, the curved serrations at opposite ends of the various separately formed parts, for instance the journals and the crank pins, are struck from centers lying in a common plane radial to the part on which they are formed and the serrations at one end of each such parts are, therefore, parallel to the serrations at the opposite ends of such part.

The curved serrations of my prior inventions are highly satisfactory and efficient in operation. There is, however, one criticism to which they have been subjected and that is the formation of curved serrations appears to offer difficulty in manufacture to many persons. While such curved serrations are, in fact, not difficult to accurately produce when proper equipment is provided therefor, the objection does in fact exist and it is the purpose of the present invention to provide a construction for obtaining an equivalent result and in which such objection does not exist.

The reason for using curved serrations in my prior invention is for the purpose of resisting possible slippage between the two parts so joined when a load is applied thereto in the direction of the length of the serrations and which would tend to cause such slippage. It will be appreciated that in event the serrations were straight and parallel a force acting in the direction of the length of the serrations would ordinarily be resisted only by the friction existing between the serrations of the two parts and by any additional means that might be provided for resisting slippage in such direction. By employing curved serrations it is impossible to apply a force to the connection which will act solely in the direction of the length of the serrations and, accordingly, the above stated objections to the straight serrations is avoided.

The present invention contemplates the use of straight serrations but in such a manner that the tendency towards slippage in the direction of length of the serrations by a force applied in such direction is materially reduced, in fact to such an extent as to render a built-up crankshaft in which the various separately formed parts are connected together by serrated connections in which the serrations are straight and parallel to each other becomes a practical matter. In overcoming the disadvantages of constructions heretofore proposed employing straight and parallel serrations for the purposes stated, in accordance with the present invention the serrations at one end of a part are angularly offset, about the center or axis of the connection when the serrated faces of such part are axially aligned, with respect to the length of the serrations at the opposite end of the part. Thus while a force may be applied to such part in the direction of the length of the serrations at one end thereof, it will act at an angle to the length of the serrations at the opposite end of the part and thus will be ineffective to tend to cause slippage of both ends of the part at the same time. It has been found that this so strengthens both ends of the part against possible slippage under a force acting in the direction of length of the serrations at either end of the part as to render the danger of such slippage too remote in practice to constitute a material factor and, therefore, results in a commercially satisfactory construction.

Referring now to the accompanying drawing, an engine crankshaft is shown as comprising separately formed main journals 10, separately formed crank pins 12, and separately formed throws 14 each interposed between a cooperating journal 10 and crank pin 12. Each of these parts is connected to its next adjacent part through abutting faces of such parts arranged in planes perpendicular to the axis of rotation of the crankshaft, specifically perpendicular to the axes of the journals 10. Each pair of abutting faces is provided with a multiplicity of straight, parallel and interfitting serrations 16, as best brought out in Figs. 2 and 3, and in accordance with the present invention, the direction of the length of the serrations 16 at one end of such part is not parallel with, but is angularly offset about the center of such connection from, the direction of length of the serrations at the opposite end of such part. In other words and referring specifically to the lefthand journal 10 as viewed in Fig. 1 the serrations 16 at the lefthand end thereof are as disclosed in Fig. 2 directed in perpendicular relationship with respect to the plane of the drawing, while the serrations 16 at the righthand end thereof are not disposed in perpendicular relationship with respect to the plane of the paper but rather out of perpendicular relationship with respect thereto. The angularity about the axis of the journal 10 between the serrations at the opposite ends thereof may vary between greater or lesser limits but such angularity in any case is preferably greater than the angle of friction of the metal of the parts which are so connected together. Preferably and as illustrated, the serrations 16 at the righthand end of the journal 10 are disposed at an angle of 90 degrees from the direction of length of the serrations 16 at the lefthand end thereof about the axis of the journal 10 as brought out in Fig. 3, as it will be appreciated that by such arrangement the maximum effect obtained by the present invention thereby occurs.

Likewise, and for instance referring to the lefthand throw 14 as viewed in Fig. 1, the serrations 16 between it and its corresponding crank pin 12 are arranged with the direction of their length at an angle to and preferably perpendicular to the direction of the length of the serrations 16 between the crank throw 14 and the journal 10 which is connected to such throw.

The particular cross-sectional conformation of the serrations 16 is relatively unimportant as long as such serrations permit cooperating parts to be joined in a direction perpendicular to the plane of their abutting faces, the triangularly sectioned serrations shown and preferably arranged with their faces directed at an angle of 60 degrees to the plane of the face on which they are formed being preferable from a manufacturing standpoint.

It will be appreciated that with such straight and parallel serrations so disposed on the various parts of the crankshaft, so long as the abutting faces between the various parts are firmly clamped together in an axial direction and against axial separation, any force which acts on one of such parts in the direction of length of the serrations of one end or face thereof, while exerting a maximum tendency to cause a slip between such abutting serrations will be resistant to a maximum extent by the oppositely directed serrations on the opposite end or face of such part. As previously stated, it has been found that the resistance offered by the angularly offset serrations at the opposite ends or faces of such parts so increases the resistance to slippage of those serrations extending in the direction in which the force is applied that any danger of such slippage is, from a practical standpoint, entirely eliminated as long as the abutting faces on the parts to which such force is applied are firmly clamped together. Thus, with the construction of the present invention and employing only straight and parallel serrations on the abutting faces of the various parts, a construction is provided in which the serrations may be formed in a conventional manner by already existing and readily available equipment found in most machine shops and, therefore, obviates the main criticisms of my previous invention above identified.

Any suitable means may be provided for maintaining the abutting faces of the various separately formed parts against axial separation. The means illustrated in Fig. 1 for this purpose are substantially identical to the means shown and claimed in the second of my above identified inventions and is as follows. Reference will be made to the connection between one of the journals 10 and its cooperating throws 14, it being understood that the same or an equivalent construction may be employed between each crank pin 12 and its cooperating throw 14. As shown in Fig. 1 the crank pin 10 is provided with a threaded aixal bore 20 and each throw 14 is provided with an aligned bore 22 of the same diameter. Each bore 22 is countersunk on its outer end to provide a recess 24 and countersunk on its inner end to provide a recess 26. The opposite ends of the bore 20 in the journal 10 are countersunk as at 28 to the same diameter as the recesses 26 and within each pair of cooperating recesses 26 and 28 a sleeve 30 is received in bridging relation with respect to the cooperating joint between the journal 10 and throw 14. A bolt 32 having a diametrically reduced shank portion is projected through each opening 22 and threaded into the corresponding end of the bore 20 of the journal 10, a washer such as 34 preferably being positioned under the head of the bolt which is completely received in the corresponding recess 24. The sleeves 30 are preferably sufficiently thin to be capable of yielding in a radial direction so as to permit slight mis-alignment of the recesses 26 and 28 should complete bottoming of the cooperating serrations 16 require this when the bolts 32 are drawn up tightly. The bolts 32 are each preferably provided with a hole such as 36 in the heads thereof through which a locking wire may be projected if necessary or desirable. Thus the bolts 32 hold cooperating parts against axial separation, and the sleeves 30 aid in preventing lateral displacement of the associated abutting faces in the direction of the length of the serrations formed thereon.

From the above it will be appreciated that in accordance with the present invention a built-up crankshaft may be provided in which the abutting faces of the various separately formed parts are provided with a plurality of straight and parallel serrations which are easily and readily machined by existing equipment and that, because of the angularly displaced or non-parallel relation of the serrations at opposite sides of ends of the parts the possibility of relative slippage between two connected parts in the direction of the serrations is eliminated to all practical purposes.

Having thus described my invention what I claim by Letters Patent is:

1. An engine crankshaft comprising, in combination, a plurality of separately formed parts arranged in end-to-end relationship and with abutting faces lying in planes perpendicular to the axis of rotation of said crankshaft, each of said abutting faces being provided with a multiplicity of serrations therein all of which are straight and parallel to each other and which lie in complementary and interfitting relationship with respect to the serrations on that face of another of said parts against which it abuts, the serrations on the abutting face at one end of one of said parts being angularly offset from the serrations on the abutting face at the opposite end thereof as viewed axially of said crankshaft, and means for maintaining said abutting faces against axial separation.

2. In an engine crankshaft, in combination, a plurality of separately formed parts arranged in end-to-end relationship with abutting faces lying in planes perpendicular to the axis of rotation of said crankshaft, each abutting pair of said faces being provided with a multiplicity of interfitting serrations therein, said serrations in each abutting pair of said faces all being straight and parallel to each other, and each of said parts having one of said abutting faces at each end thereof axially of said crankshaft arranged with the direction of the length of the serrations in one of said faces at an angle to the direction of the length of the serrations in the other of said faces, and means for holding said faces against separation axially of said crankshaft.

3. In an engine crankshaft, in combination, a plurality of separately formed parts arranged in end-to-end relationship with abutting faces lying in planes perpendicular to the axis of rotation of said crankshaft, each abutting pair of said faces being provided with a multiplicity of interfitting serrations therein, said serrations in each abutting pair of said faces all being straight and parallel to each other, and each of said parts having one of said abutting faces at each end thereof axially of said crankshaft arranged with the direction of the length of the serrations in one of said faces perpendicular to the direction of the length of the serrations in the other of said faces, and means for holding said faces against separation axially of said crankshaft.

4. In an engine crankshaft, in combination, a plurality of separately formed parts arranged in end-to-end relationship with abutting faces lying in planes perpendicular to the axis of rotation of said crankshaft, each abutting pair of said faces being provided with a multiplicity of interfitting serrations therein, said serrations in each abutting pair of said faces all being straight and parallel to each other, and each of said parts having one of said abutting faces at each end thereof axially of said crankshaft arranged with the direction of the length of the serrations in one of said faces at an angle to the direction of the length of the serrations in the other of said faces, means for holding said faces against separation axially of said crankshaft, and means resisting relative movement between said abutting faces in the direction of the length of said serrations.

5. In an engine crankshaft, in combination, a separately formed throw, a separately formed journal, a separately formed crank pin, said throw being interposed between said pin and said journal and having a pair of faces one arranged in abutting relationship to said pin and one arranged in abutting relationship with said journal and lying in planes perpendicular to the axis of rotation of said crankshaft, each of said faces having a multiplicity of serrations formed therein arranged in intermeshing relationship with respect to complementarily formed serrations on said throw and said pin, respectively, all of said serrations in each of said faces being straight and parallel to each other, and the serrations in one of said faces being disposed with their lengths at an angle to the length of the serrations in the other of said faces, and means removably securing said throw against separation axially of said crankshaft to both said pin and said journal.

6. In an engine crankshaft, in combination, a separately formed journal, a pair of separately formed throws, said journal being interposed between said throws with its end faces arranged in planes perpendicular to its axis and in abutting relationship with respect to said throws, said end faces having a multiplicity of serrations formed therein arranged in interfitting relationship with respect to complementary formed serrations in the corresponding of said throws, the serrations in each of said faces all being straight and parallel to each other, the serrations in one of said faces being arranged with the direction of their length angularly displaced about the axis of said journal from the direction of the length of the serrations of the other of said faces, and means for holding said journal against separation from said throws axially of said crankshaft.

7. In an engine crankshaft, in combination, a separately formed crank pin, a pair of separately formed throws, said crank pin being interposed between said throws with its end faces arranged in planes perpendicular to its axis and in abutting relationship with respect to said throws, said end faces each having a multiplicity of serrations formed therein arranged in interfitting relationship with respect to complementarily formed serrations in the corresponding of said throws, the serrations on each of said faces all being straight and parallel to each other, the serrations in one of said faces being arranged with the direction of their length angularly displaced about the axis of said crank pin from the direction of the length of the serrations in the other of said faces, and means for holding said crank pin against separation from said throws axially of said crankshaft.

8. In an engine crankshaft, in combination, a separately formed journal, a pair of separately formed throws, said journal being interposed between said throws with its end faces arranged in planes perpendicular to its axis and in abutting relationship with respect to said throws, said end faces having a multiplicity of serrations formed therein arranged in interfitting relationship with respect to complementarily formed serrations in the corresponding of said throws, the serrations in each of said faces all being straight and parallel to each other, the serrations in one of said faces being arranged with the direction of their length angularly displaced about the axis of said journal from the direction of the length of the serrations of the other of said faces, means for holding said journal against separation from said throws but axially of said crankshaft, and additional means for resisting relative movement of said journal with respect to said throws in the direction of length of said serrations.

9. An engine crankshaft comprising, in combination, a plurality of separately formed parts arranged with abutting faces disposed in planes perpendicular to the axis of rotation of said crankshaft, one of said parts being disposed between a pair of other of said parts, a plurality of straight and parallel serrations covering substantially the entire surface of one end of said one of said parts and a plurality of straight and parallel serrations covering substantially the entire surface of the opposite end thereof, the direction of the length of the serrations at one of said ends being disposed at an angle to the direction of length of the serrations at the opposite end thereof, and means for maintaining said abutting faces against separation axially of said crankshaft.

JULIUS DUSEVOIR.